United States Patent [19]

Heitmann

[11] 4,124,869
[45] Nov. 7, 1978

[54] SYSTEM FOR THE DIGITAL CLAMPING OF PERIODIC, BINARY ENCODED SIGNALS

[75] Inventor: Jürgen Heitmann, Seeheim, Germany

[73] Assignee: Robert Bosch GmbH, Stuttgart, Germany

[21] Appl. No.: 808,702

[22] Filed: Jun. 21, 1977

[30] Foreign Application Priority Data

Jun. 25, 1976 [DE] Fed. Rep. of Germany ....... 2628662

[51] Int. Cl.² .......................... H04N 5/16; H04L 25/06
[52] U.S. Cl. ...................................... 358/171; 178/68; 325/38 A
[58] Field of Search ........................ 358/171, 172, 263; 325/38 R, 38 A, 42, 321, 326; 179/15 AE; 178/68

[56] References Cited

U.S. PATENT DOCUMENTS

| 3,267,459 | 8/1966 | Chomicki et al. | 178/68 UX |
| 3,518,662 | 6/1970 | Nakagome et al. | 178/68 UX |
| 3,777,056 | 12/1973 | Pieters | 358/171 X |

Primary Examiner—Robert L. Richardson
Attorney, Agent, or Firm—Littlepage, Quaintance, Murphy, Richardson and Webner

[57] ABSTRACT

A binary encoded signal which is to be clamped at a desired binary value is simultaneously applied to a digital subtractor and a digital adder. The digital subtractor subtracts the difference between the desired binary value and the value of the binary encoded signal. The resulting difference is applied to a storage flip-flop circuit having a switching pulse input which receives a periodic signal. The flip-flop transfers the last received difference until the periodic signal is received causing it to transfer the latest received difference. A binary adder adds the output of the storage flip-flop to the binary encoded signal. This results in a corrected clamped binary encoded signal.

4 Claims, 2 Drawing Figures

SYSTEM FOR THE DIGITAL CLAMPING OF PERIODIC, BINARY ENCODED SIGNALS

BACKGROUND OF THE INVENTION

1. Field of the Invention

The invention generally relates to clamping circuits in which a waveform is adjusted and maintained at a definite level when recurring after intervals and more specifically applies to a system for digitally clamping binary encoded, periodic signals such as the horizontal blanking of a television video signal.

2. Background of the Invention

The conversion of an analog video signal to a pulse code modulated (PCM) signal and its digital transmission are well known in the art as discussed in "INTERNATIONALE ELEKTRONISCHE RUNDSCHAU" 1973, No. 1, Pages 8-12. The conversion of an analog video signal to a pulse code modulated signal is accomplished in an encoder, which quantizes the analog video signal and converts it to a binary encoded video signal of $2^n$ bit code words. The resulting value of these code words can be shifted towards positive or negative values through temperature influences changing the structural components or other deviations, and thereby the data channel (DC) level of the binary encoded video signal will vary and not correspond to the analog signal.

SUMMARY OF THE INVENTION

Described is a digital clamping circuit which has specific application in clamping the binary encoded periodic video signals which appear during the horizontal blanking interval. The binary encoded signal is simultaneously fed to a digital subtractor and a digital adder. The digital subtractor compares the value of the signal at the horizontal blanking interval to the desired binary value. Usually, in a video signal which is quantized in $2^8$ or 256 different video amplitude steps the video signal at the black level is equal to 128. Therefore, the subtractor subtracts the value of the encoded signal from 128. This difference is fed to a storage flip-flop which is responsive to the horizontal pulse signal portion of the video signal. The function of the storage flip-flop is to transfer the last received difference from the digital subtractor to the digital adder. The transfer of information is continued until the next horizontal pulse signal is received. The digital adder adds the value to the encoded signal thereby correcting the signal and providing an output of a clamped digital encoded signal of the horizontal blanking interval.

It is an object of this invention to provide a digital clamping system which has the advantage that, similar to the case for the restoration of the data channel value in analog video signals, a lost DC value can be reintroduced into the binary encoded, periodic signals. It is a further object of the invention to provide a pulse code modulated video signal which can be digitally clamped in a simple fashion. It is yet a further object of this invention to provide a digital clamping circuit which can be applied to the video signal during the horizontal blanking interval.

BRIEF DESCRIPTION OF THE DRAWINGS

Additional advantages and refinements of the invention system are explained and described in more detail in the following drawings in which.

DESCRIPTION OF THE PREFERRED EMBODIMENT

Figure 1:
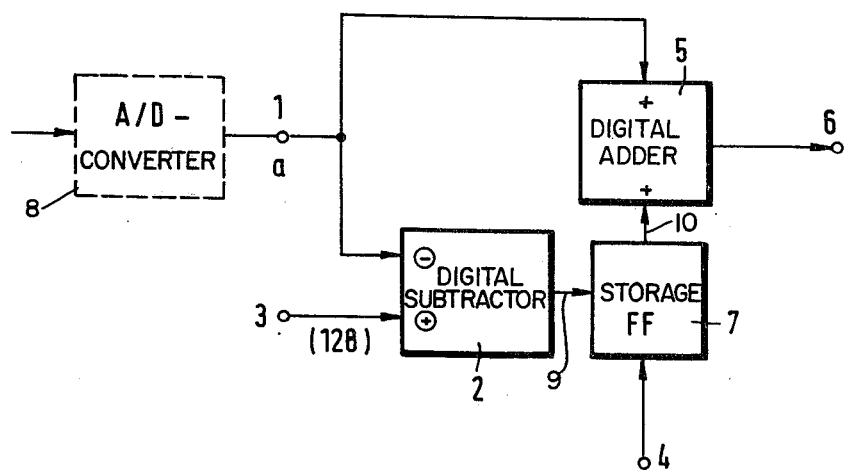
FIG. 1 is a block diagram of the invention system.

The block diagram shown in FIG. 1 represents a digital clamping circuit for the restoration of the lost data channel value in a binary encoded, periodic signal. This periodic signal is to be a pulse code modulated signal in the design example given. It is assumed that the value of the signal has been shifted by a defective analog/digital conversion process in the encoder 8. During a digital/analog back conversion process, an upward shift would cause a difference which leads to a DC shift of the analog video signal in the direction of the white level value.

To eliminate this conversion error, a difference between the actual binary value $a$ of the pulse code modulated video signal appearing at terminal 1 and the desired binary value (black level value shown by dotted line) is first determined in a digital subtractor 2. The desired binary value is fed via terminal 3 to the subtractor 2. As noted at the outset, in the preferred embodiment the desired binary value is set at 128. Since this desired binary value is only in the region of the horizontal blanking of the video signal, care must be taken that the digital subtractor 2 determines the difference only in the horizontal blanking interval. This is achieved by connecting after the digital subtractor 2 a series of storage flip-flops 7 which are responsive to a horizontal pulse signal (FIG. 2b) fed via terminal 4. This storage pulse signal causes the storage flip-flops 7 to transfer the information appearing at their inputs 9 to their outputs 10 and to store them until the next horizontal pulse signal. The digital adder 5 adds the difference transferred by outputs 10 of the storage flip-flops 7 and the value of the binary encoded signal and provides at terminal 6 a corrected binary encoded signal.

EXAMPLE OF OPERATION

Figure 2:
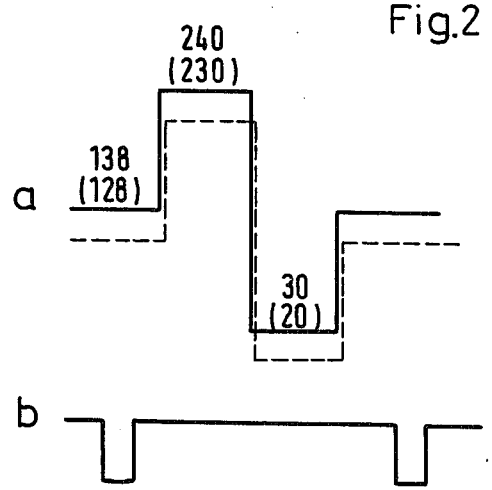
FIG. 2 is a voltage-time diagram explaining the manner of operation of the block diagram.

Assume, for example, that the desired binary value of a video signal, quantized in $2^8 = 256$ different amplitude steps, has shifted from 128 (black level value) to 138 (FIG. 2a). The difference value of $128 - 138 = -10$ is determined by the subtractor 2. This amount is fed to the input 9 of the storage flip-flop circuits 7 where it is stored and transferred by output 10 to the digital adder 5. The encoded binary signal is also provided to the digital adder 5. In the digital adder 5, the difference determined to the binary value of $-10$ is added to the actual binary value of the pulse code modulated video signal of 138 so that a digitally clamped, pulse code modulated video signal with a binary value of 128 can be picked off at the output of the digital adder 5 at terminal 6. Furthermore, since the determined difference value at the output 10 of the digital storage flip-flops 7 is stored for the duration of one-line period or until the next horizontal pulse signal is received at terminal 4, all remaining binary values are also reduced by the determined difference value of $-10$ during the line period, i.e., they are digitally clamped. Therefore, the inaccurate values 240 and 30 are clamped to accurate values 230 and 20, respectively.

What is claimed:

1. An apparatus for digitally clamping to a desired binary level binary encoded signals comprising:

a. digital subtractor means for providing at its output the difference between the desired binary level and the binary encoded signal;

b. storage flip-flop means responsive to a switching pulse input connected to the output of said subtractor means for transferring to its output said difference; and c. digital adding means for adding the output of said storage flip-flop means and the binary encoded signal thereby providing at its output a digitally clamped binary encoded signal.

2. The apparatus as described in claim 1 wherein said storage flip-flop means has a switching pulse input connected to a horizontal pulse signal of a pulse code modulated video signal, said signal causing said storage flip-flop means to transfer the information appearing at its input to its output and to store this information until the next line of the horizontal pulse signal.

3. An apparatus for digitally clamping a binary encoded PCM video signal having a horizontal blanking interval with a preset black level value comprising:

a. a digital subtractor means for providing at its output the difference between the preset black level value and the binary encoded signal;

b. storage flip-flop means including an input and an output responsive to the horizontal blanking interval of the binary encoded signal, the input of said storage flip-flop means being connected to the output of said digital subtractor for transferring the difference which occurs during the horizontal blanking interval; and c. digital adding means including inputs and an output for adding the output of said storage flip-flop means and and the binary encoded PCM video signal thereby providing at its output a digitally clamped binary encoded PCM video signal.

4. The apparatus as described in claim 3 wherein said preset black level value is equal to 128.

* * * * *